United States Patent [19]
Adams et al.

[11] Patent Number: 5,152,480
[45] Date of Patent: Oct. 6, 1992

[54] PLANAR COIL CONSTRUCTION

[75] Inventors: Lowell J. Adams, North Canton; William A. Beard, Jr., Uniontown; Steven C. Simshauser, Akron; Norbert A. Weisend, Jr., Cuyahoga Falls; Thomas E. Wohlwender, Akron, all of Ohio

[73] Assignee: The B. F. Goodrich Company, Akron, Ohio

[21] Appl. No.: 437,489

[22] Filed: Nov. 15, 1989

[51] Int. Cl.$^5$ ............................................. B64D 15/00
[52] U.S. Cl. ................................................ 244/134 D
[58] Field of Search ......................... 244/134 R, 134 D

[56] References Cited

U.S. PATENT DOCUMENTS

| | | | |
|---|---|---|---|
| 3,549,964 | 12/1970 | Levin et al. | 317/262 |
| 3,672,610 | 6/1972 | Levin | 244/134 |
| 3,779,488 | 12/1973 | Levin | 244/134 |
| 3,809,341 | 5/1974 | Levin et al. | 244/134 |
| 4,399,967 | 8/1983 | Sandorff | 244/134 |
| 4,458,865 | 7/1984 | Sandorff | 244/134 |
| 4,501,398 | 2/1985 | Sandorff | 244/134 |
| 4,545,553 | 10/1985 | Finke et al. | 244/134 |
| 4,678,144 | 7/1987 | Goehner et al. | 244/134 |
| 4,690,353 | 9/1987 | Haslim et al. | 244/134 |
| 4,875,644 | 10/1989 | Adams et al. | 244/134 |

FOREIGN PATENT DOCUMENTS 505433 5/1939 United Kingdom .

OTHER PUBLICATIONS

"Building Magnetics with Flexible Circuits", Feb. 1989, Powertechnics Mag., Vern Gregory.
Electro-Impulse De-Icing Systems-Issues and Concerns for Certification Jan. 9-12, 1989, AIAA '89, FAA Technical Center—Charles Masters.
Developments in Expulsive Separation Ice Protection Blankets Jan. 9-12, 1989, AIAA '89, FAA Technical Center—J. Goldberg & B. Lardiere.
Electromagnetic Emissions from a Modular Low Voltage EIDI System Jan. 9-12, 1989, AIAA '89, FAA Technical Center—P. Zieve, B. Huffer & J. Ng.
Electro-Expulsive DeIcing System-Nov. 7-10, 1988, NASA Ames Research Center Low Voltage Electro-Impulse De-Icer, AIAA '88, Jan. 11-14, 1988, Zieve et al.
Electro-Impulse De-Icing Electrodynamic Solution by Discrete Elements AIAA '88, Jan. 11-14, 1988, Bernhart and Schrag.
Test and Analysis of Electro-Impulse De-Icing Systems in Turbine Engine Inlets AIAA '88, Jan. 11-14, 1988, Nelepovitz, Rosenthal & Rockholt.
Analysis and Tests for Design of an Electro-Impulse De-Icing System, May, 1985, Zumwalt, Schrag, Bernhart and Friedberg.
Flight and Wind Tunnel Tests of an Electro-Impulse De-Icing System, Zumwalt and Mueller.
A Finite Element Study of the EIDI System, University of Akron, Khatkhate, Scavuzzo and Chu.

Primary Examiner—Joseph F. Peters, Jr.
Assistant Examiner—Virna Lissi Mojica
Attorney, Agent, or Firm—Weston, Hurd, Fallon, Paisley & Howley

[57] ABSTRACT

A planar coil construction, especially adapted for use in a force-producing device such as a de-icer, includes first and second sheet-like members, each defined by a continuous electrical conductor having a plurality of turns and first and second ends. The first end of the first conductor defines an electrical input to the coil, while the second end of the second conductor defines an electrical output from the coil. The second end of the first conductor and the first end of the second conductor are electrically connected. The sheet-like members are superimposed such that current flow through adjacent turns of the conductors is in the same direction. Within each sheet-like member, adjacent conductors also have current flow in the same direction. The invention includes a technique for spacing the conductors by means of a dielectric layer, and a technique for encapsulating the sheet-like members. Alternative embodiments are provided wherein different relationships among the sheet-like members are possible as they might be used for force-producing elements in a de-icer.

29 Claims, 5 Drawing Sheets

PLANAR COIL CONSTRUCTION

BACKGROUND OF THE INVENTION

1. Cross-Reference to Related Patent

U.S. Pat. No. 4,875,644, application Ser. No. 07/258,279, filed Oct. 14, 1988, entitled "Electro-Repulsive Separation System for De-icing," by Lowell J. Adams, et al., the disclosure of which is incorporated herein by reference (hereinafter referred to as the "Electro-Repulsive Separation System Patent").

2. Field of the Invention

The invention relates to planar coils and, more particularly, to planar coils especially adapted for use in a force-producing device such as a de-icer.

3. Description of the Prior Art

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used extensively is so-called mechanical de-icing. In mechanical de-icing, the leading edges of structural members are distorted in some manner so as to crack ice that has accumulated thereon for dispersal into the airstream. A popular mechanical de-icing technique is the use of expandable tube-like structures that are periodically inflatable. Inflation of the structures results in their expansion or stretching by 40% or more. Such expansion typically occurs over approximately 2–6 seconds and results in a substantial change in the profile of the de-icer, thereby cracking accumulated ice. Unfortunately, expansion of the devices can negatively influence the airflow passing over the aircraft structure. Also, they are most effective when ice has accumulated to a substantial extent, approximately 0.25 inch or more, thereby limiting their effectiveness. Desirably, ice removal would be accomplished long before accumulations approximating 0.25 inch have been attained.

A more recent mechanical de-icing technique utilizes internal "hammers" to distort the leading edges of structural members. Such an approach is exemplified by U.S. Pat. No. 3,549,964 to Levin et al., wherein electrical pulses from a pulse generator are routed to a coil of a spark-gap pressure transducer disposed adjacent the inner wall of the structural member. The primary current in the coil induces a current in the wall of the structural member and the magnetic fields produced by the currents interact so as to deform the member.

U.S. Pat. Nos. 3,672,610 and 3,779,488 to Levin et al. and U.S. Pat. No. 4,399,967 to Sandorff disclose aircraft de-icers that utilize energized induction coils to vibrate or torque the surface on which ice forms. Each of these devices employs electromagnetic coils or magneto-restrictive vibrators located on the side of the surface opposite to that on which ice accumulates. In U.S. Pat. No. 3,809,341 to Levin et al., flat buses are arranged opposite one another, with one side of each bus being disposed adjacent an inner surface of an ice-collecting wall. An electric current is passed through each bus and the resulting interacting magnetic fields force the buses apart and deform the ice-collecting walls.

A more recent approach is shown by U.S. Pat. No. 4,690,353 to Haslim et al. In the '353 patent, one or more overlapped flexible ribbon conductors are imbedded in an elastomeric material that is affixed to the outer surface of a structural member. The conductors are fed large current pulses from a power storage unit. The resulting interacting magnetic fields produce an electro-expulsive force that distends the elastomeric member. The distension is almost instantaneous when a current pulse reaches the conductors, and is believed to be effective in removing thin layers of ice. Although the device disclosed in the '353 patent is believed to be an improvement over previous mechanical de-icing techniques, certain drawbacks remain. One of the drawbacks relates to the direction of current flow in adjacent electrically conductive members. It is believed that the current flow disclosed in the '353 patent produces inefficiencies that significantly restrict the effectiveness of the device.

The Electro-Repulsive Separation System Patent discloses a device that is an improvement over that disclosed in the '353 patent. In the Electro-Repulsive Separation System Patent, the electrically conductive members are arranged with current flow in a common direction in a conductor layer such that a greater electro-expulsive force can be generated than with the serpentine configuration disclosed in the '353 patent. Also, the Electro-Repulsive Separation System Patent teaches the delivery of a current pulse of predetermined magnitude, shape and duration that provides more effective de-icing action.

Despite the advances taught by the prior art, particularly the Electro-Repulsive Separation System Patent, there remains a need for a de-icer that provides effective de-icing action. A particular concern relates to the electrically conductive members that are used with the prior devices. It is desired to provide coils that are as thin as possible, while being relatively inexpensive and easy to manufacture. Desirably, any such coils would have a very high efficiency, that is, they would generate more force than prior electrically conductive members for a given current input. The coils also desirably would permit a small or large area of force production as desired for a de-icer construction.

SUMMARY OF THE INVENTION

The present invention addresses the foregoing concerns and provides a new and improved planar coil construction especially adapted for use as part of a de-icer. The planar coil according to the invention includes a first sheet-like member defined by a first, continuous, electrical conductor having a plurality of turns and first and second ends. The first end of the first conductor defines an electrical input to the coil, and the second end of the first conductor defines an electrical output. The invention includes a second sheet-like member defined by a second, continuous, electrical conductor having a plurality of turns and first and second ends. The first end of the second conductor defines an electrical input, and the second end of the second conductor defines an electrical output from the coil. The second end of the first conductor and the first end of the second conductor are electrically connected. The first and second sheet-like members are disposed parallel to each other with the turns of the first and second conductors being positioned adjacent each other. The direction of current flow through the turns of the first conductor can be arranged to be substantially the same as that through the turns of the second conductor, or it can be arranged to be substantially opposite that through the turns of the second conductor. In addition, within a sheet-like member the adjacent conductors from the center out have current flow in the same direction, which is of particular importance for electrorepulsive force de-icers.

In one embodiment of the invention, the turns are rectangular, while in other embodiments the turns are spiral-shaped, square, or any other desired geometry. The invention also includes a technique for separating the sheet-like members by a dielectric layer, as well as a means for encapsulating the sheet-like members. Additional sheet-like members can be provided, if desired, and connected to each other and to the first and second sheet-like members. When more than two members are used, if the direction of current flow in a given layer is opposite to the direction of current flow in adjacent layers, a strong repulsive force is created when a high current pulse is applied. If the direction of current flow in a given layer is in the same direction as in adjacent layers, it may be used for an eddy current de-icer. The invention also contemplates incorporating a ferromagnetic or paramagnetic material (hereinafter referred to as "magnetic material") on the outer and/or inner surface of the coil in order to improve or shape the magnetic field generated by the coil and increase the resultant force.

Regardless of the embodiment of the invention that is utilized, the sheet-like members can be manufactured readily from metal foil or a flat-braided conductor. The coil according to the invention can be assembled readily, and it provides significant force-generating capabilities compared with prior coil constructions.

The foregoing and other features and advantages of the present invention will become more apparent when viewed in light of the description of the best embodiment of the invention and the drawings that follow, which together form a part of the specification.

DETAILED DESCRIPTION OF THE INVENTION

The present invention provides a planar coil construction especially adapted for use as part of a de-icer that may be attached to the leading edges of structural members. De-icing is the removal of ice subsequent to its formation upon a leading edge. A leading edge is that portion of a structural member that functions to meet and break an airstream impinging upon the surface of the structural member. Examples of leading edges are the forward portions of wings, stabilizers, struts, nacelles, rotors and other housings and protrusions first impacted by an airstream.

Although the planar coil construction of the present invention is described in the environment of a de-icer, it is to be understood that the invention can be used in other environments. For example, the invention could be used as a force-generating element in a vibratory conveyor, as a switching device, or in a variety of other applications. Accordingly, the invention as described and claimed herein shall not be limited solely to use in de-icer applications.

Figure 1:
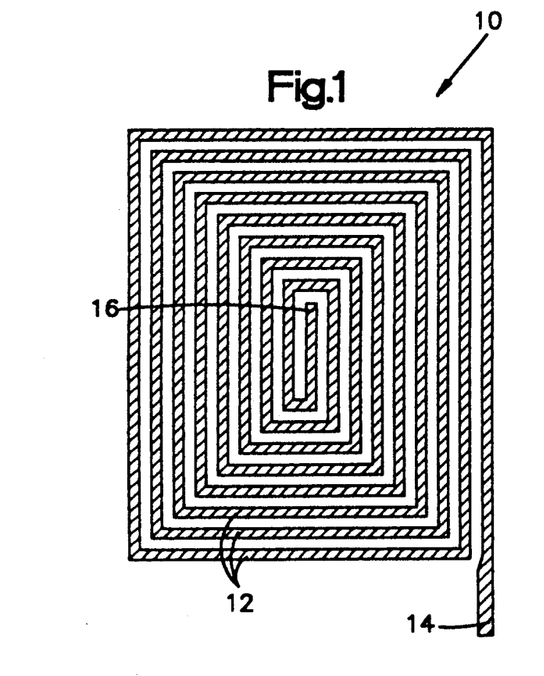
FIG. 1 is a plan view of a sheet-like member formed of a continuous electrical conductor that is usable with the present invention.

Referring to FIG. 1, a first, sheet-like member is indicated by the reference numeral 10. The member 10 is defined by a first, continuous, electrical conductor having a plurality of turns 12, a first end 14 and a second end 16. The first end 14 defines an electrical input to the member 10, while the second end 16 defines an electrical output from the member 10. The member 10 is formed from a single sheet of unalloyed copper or aluminum having a thickness of about 0.016 inch. The turns 12 have a width within the range of 0.070-0.125 inch.

The first end 14 is disposed at one corner of the member 10, while the second end 16 is disposed at the center. Although the member 10 is illustrated as being rectangular, it could be square, circular, or any other desired shape.

Figure 2:
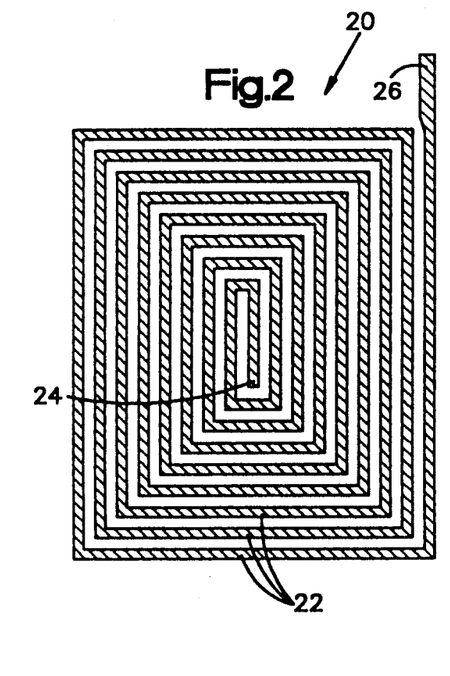
FIG. 2 is a view similar to FIG. 1, showing another sheet-like member.

Referring to FIG. 2, a second, sheet-like member is indicated by the reference numeral 20. The member 20 is defined by a second, continuous, electrical conductor having a plurality of turns 22, a first end 24, and a second end 26. The first end 24 defines an electrical input to the member 20, while the second end 26 defines an electrical output from the member 20. The member 20 is formed from a single sheet of unalloyed copper or aluminum having a thickness of about 0.016 inch. The turns 22 have a width within the range of 0.070-0.125 inch. As with the member 10, the member 20 is rectangular, with one end disposed at a corner and the other end disposed at the center.

Figure 3:
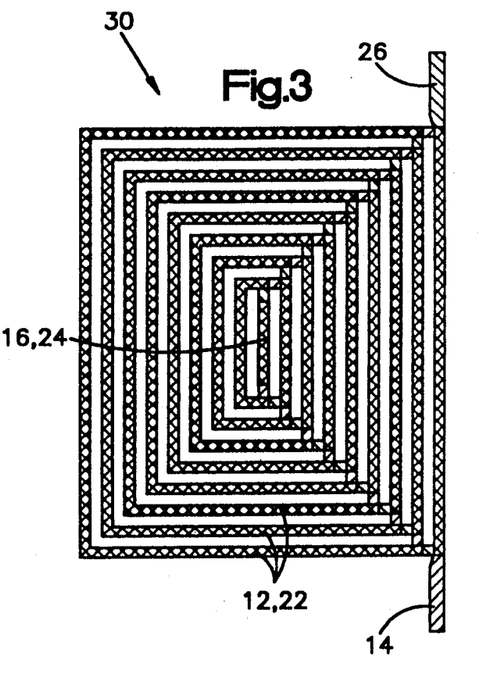
FIG. 3 is a view similar to FIG. 1, showing the sheet-like members of FIGS. 1 and 2 completely superimposed.

Referring to FIG. 3, the members 10, 20 are illustrated in a "completely superimposed" arrangement to form a coil indicated by the reference numeral 30. In this arrangement, the turns 12 are disposed immediately adjacent comparable turns 22. The ends 16, 24 are joined as by soldering or welding to form an electrical connection. As will be appreciated from an examination of FIG. 3, electrical current directed into the first end 14 will follow a path through the turns 12 that is in the same direction as the superimposed, adjacent turns 22. The first member 10 typically has 12½ turns, as does the second member 20. (An 8⅛ turn member is shown for clarity of illustration). Accordingly, the superimposed members 10, 20 define a coil pair 30 having 24½ turns.

Figure 4:
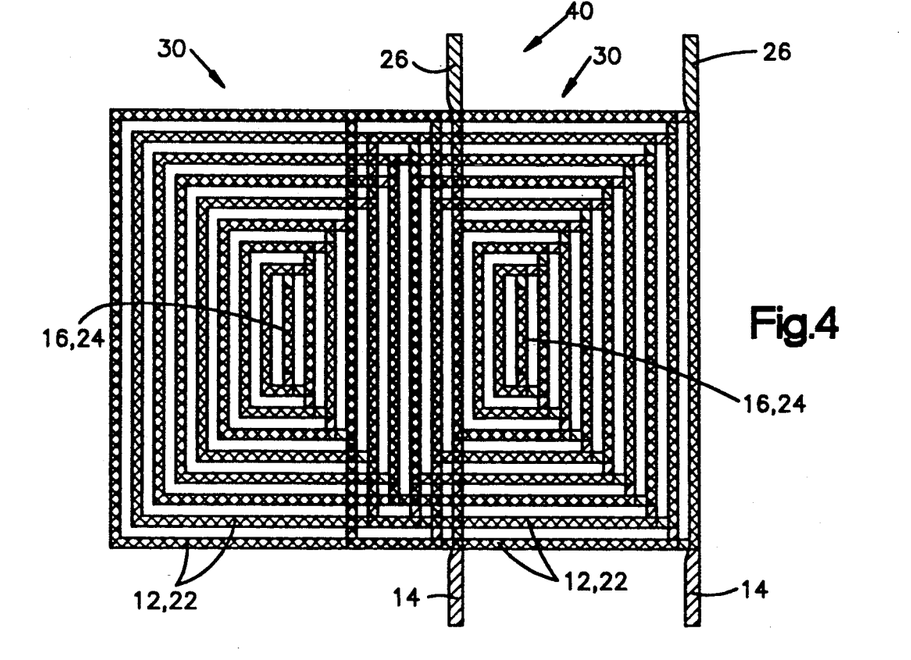
FIG. 4 is a view similar to FIG. 3, showing a first superimposed pair of sheet-like members partially superimposed with respect to a second pair of superimposed sheet-like members.

Referring to FIG. 4, two assembled coil pairs 30 have been formed as shown in FIG. 3, and are "partially superimposed" with respect to each other. The resultant coil construction, indicated by the reference numeral 40, includes about 25% of the total turns overlapped at the center of the assembled coil pairs 30.

Figure 5A:
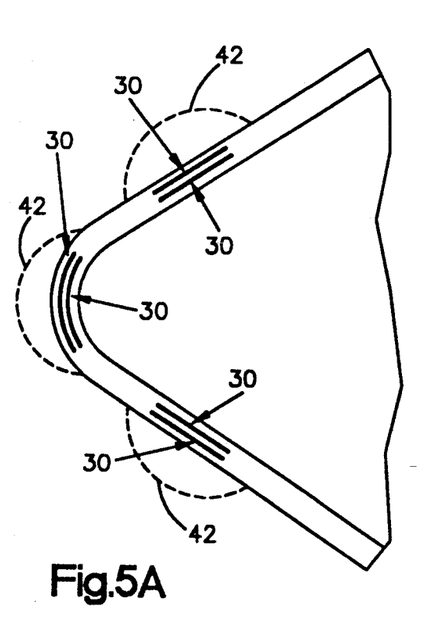
FIGS. 5A and 5B are schematic cross-sectional views of planar coils according to the invention as they might be used in a de-icer.
Figure 5B:
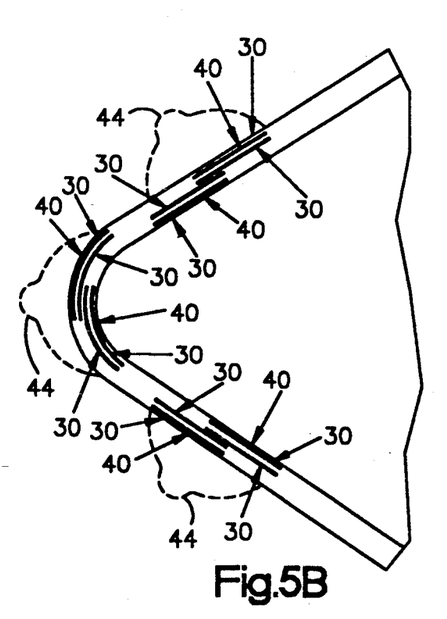

Referring to FIG. 5A, arrangements of two coil pairs 30 are shown as they might be used in practice to form part of a de-icer. As is explained in more detail in the Electro-Repulsive Separation System Patent, upon supplying a short-duration, shaped, high-current pulse to the coil pairs 30, the outermost portion of the de-icer will be distended as indicated at 42 so as to shatter, debond, and expel any ice that may have accumulated thereon. Referring to FIG. 5B, the coil pairs 30 are partially superimposed and an enhanced force will be generated in the region of the overlap where, presumably, the de-icing action will be enhanced. The enhanced distension of the de-icer is indicated by the reference numeral 44.

Figure 6:
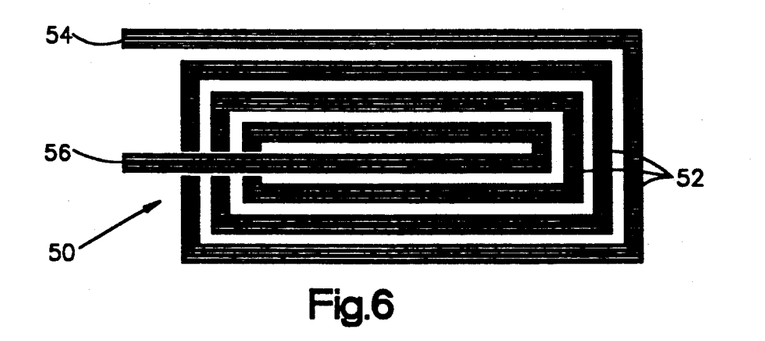
FIG. 6 is a plan view of an alternative embodiment of the sheet-like member of FIG. 1.

Referring to FIG. 6, an alternative construction of a sheet-like member is indicated schematically by the reference numeral 50. The member 50, like the members 10, 20, is defined by a first, continuous, electrical conductor having a plurality of turns 52, a first end 54, and a second end 56. Unlike the members 10, 20, the second end 56 crosses a portion of the turns 52 and is disposed adjacent the first end 54 at a location outside the outermost turn 52. The first end 54 defines an electrical input to the member 50, while the second end 56 defines an electrical output from the member 50. The second end 56 is electrically isolated from the turns 52 that are crossed. The member 50 is formed from a single sheet of unalloyed copper or aluminum having a thickness of about 0.016 inch. The turns 52 have a width within the range of 0.070-0.125 inch.

Figure 7:
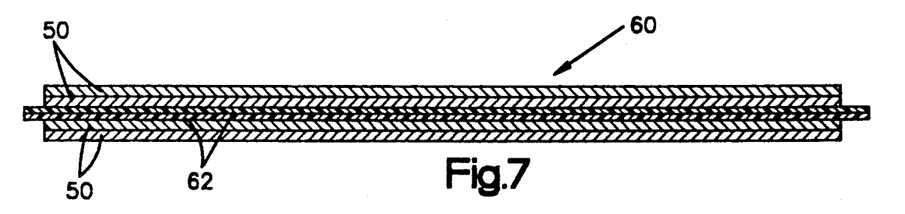
FIG. 7 is schematic, cross-sectional view of an assembled coil construction employing four superimposed sheet-like members.

Referring to FIG. 7, an assembled coil construction employing four sheet-like members 50 is indicated schematically by the reference numeral 60. Pairs of the members 50 are separated by dielectric layers 62 as well as the second end 56 of the members 50. The dielectric layers 62 preferably are formed of a material such as two layers of polyamide film, each having a thickness of about 0.003 inch. A suitable polyamide film is available from the E. I. Dupont deNemours & Company under the trademark KAPTON. Before use, the film should be surface-treated by acid-etching, plasma treating or the like to improve adhesion.

Figure 8:
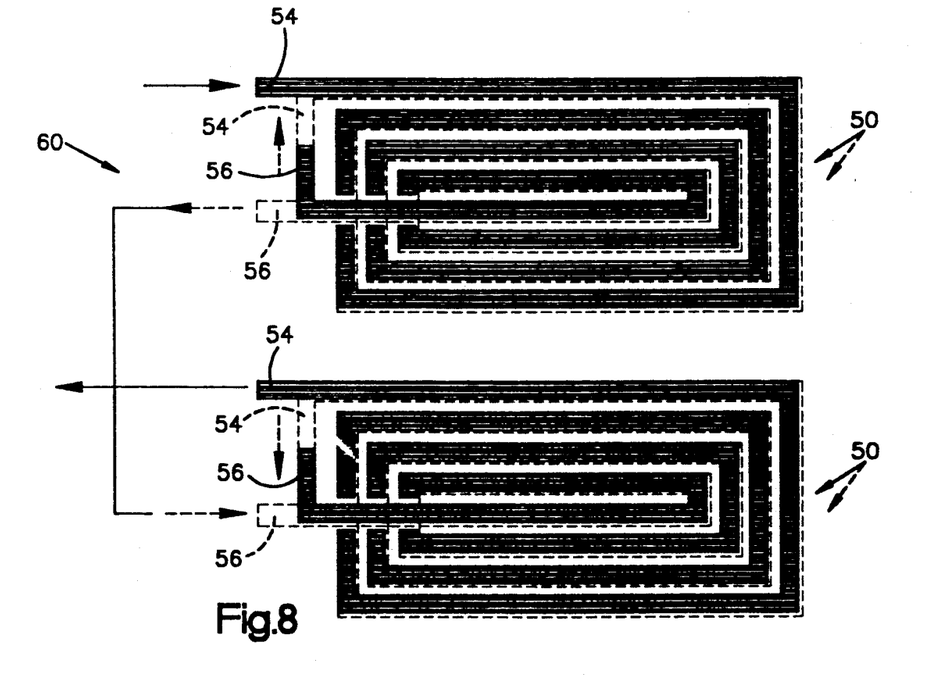
FIG. 8 is a plan view of the coil construction of FIG. 7, with the sheet-like members displaced relative to each other for clarity in illustrating the directions of current flow.

Referring to FIG. 8, the members 50 of the coil assembly 60 are shown displaced relative to each other for purposes of illustrating the directions of current flow therein. The uppermost member 50 is shown in solid lines, while the immediately adjacent lower member 50 is shown by dashed lines. As can be seen in FIG. 8, the second end 56 of the uppermost sheet 50 is electrically connected to the first end 54 of the immediately adjacent lower member 50. The output of the lower member 50 is directed through the end 56 to the second end 56 of the lower member 50 of the adjacent coil pair. The lower coil pair members 50 are connected in the same manner as the upper coil pair members 50. However, because the electrical input is to the second end 56 of the lower member 50, current flow through the lower coil pairs is in a direction opposite to that of the upper coil pairs. As shown in FIG. 8, current flow through the upper coil pairs is in a clockwise direction, while current flow through the lower coil pairs is in a counterclockwise direction. Due to the opposing directions of current flow in the upper coil pair and lower coil pair conductors, and because the coil pairs are separated by the KAPTON film 62, upon supplying a short-duration, high-current pulse to the coil 60, the respective upper and lower coil pairs will be forcefully displaced away from each other. This would constitute a force element for an electro-repulsive type of de-icer.

As in the de-icer schematically indicated in FIG. 5A, the displacement of the coil force elements can be utilized in a de-icer to provide de-icing action. If the direction of current flow in the lower coil pair is reversed by electrically connecting the upper coil pair second end 56 to the first end 54 of the adjacent lower coil pair, current flow through the lower coil pair is in the same direction as that of the upper coil pair. The coil pairs thus may be used in an eddy current type of de-icer construction.

Referring to FIGS. 9A-9G, a schematic view of planar coils according to the invention during their manufacture for an eddy current de-icer is illustrated. It will be assumed that the arrangement shown in FIGS. 9A-9G incorporates the members 10, 20, although the members 50 could be employed with equal facility.

Figure 9A:
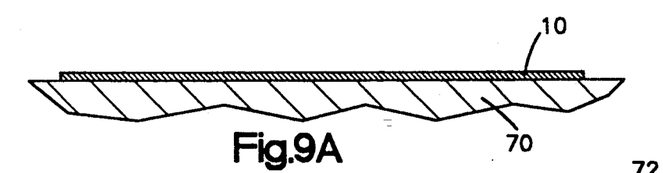
FIGS. 9A-9F are cross-sectional views similar to FIG. 7 showing how planar coils according to the invention can be assembled for use as a force-producing element as part of a de-icer.
Figure 9B:
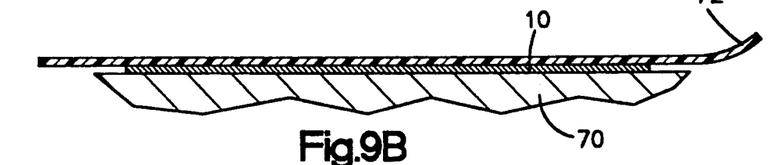

In FIG. 9A, the member 10 is illustrated as it is manufactured initially in an etching operation. In such an operation, a sheet of unalloyed copper is attached to a backing sheet 70. The copper sheet is coated with a substance, such as a photo-resist material, that is impervious to an etching material such as sulfuric acid. The backing sheet 70 also is impervious to the acid. Upon applying the acid to the surface of the copper sheet, copper will be removed in those areas not protected by the photo-resist material. After the copper in the unprotected areas has been removed, the sheet will take the appearance of the member 10 shown in FIG. 1. The member 10 also could be formed in a stamping operation or a machining operation. If desired, the member 10 could be made from a continuous flat-braided conductor.

Figure 9C:
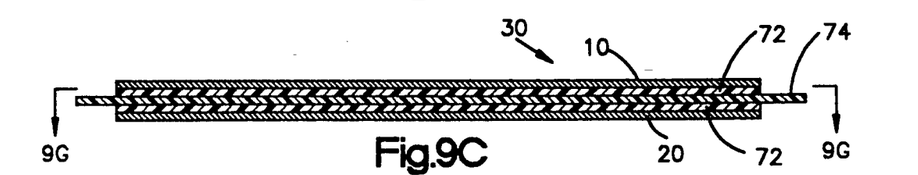
Figure 9D:
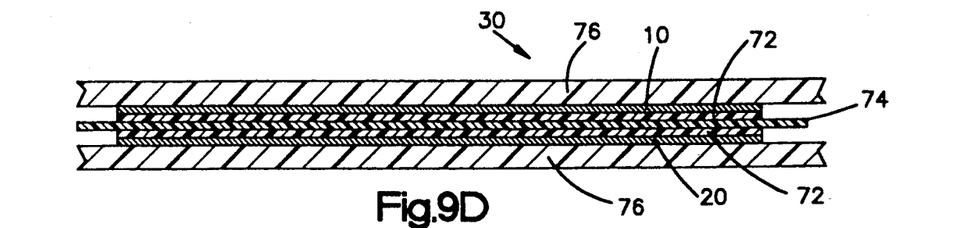

In order to process the member 10 further, it is necessary to remove it from the backing sheet 70. This result is accomplished by applying a layer of double-sided tape 72 to the exposed surface of the member 10. The tape 72 has a thickness of about 0.0045 inch. A suitable tape 72 can be obtained from Fasson Corporation under the trademark FASTAPE A. Upon lifting the tape 72, the member 10 will be removed from the backing sheet 70. The edges of the tape 72 are trimmed to closely approximate the outer dimensions of the member 10. Thereafter, the exposed adhesive side of the tape 72 can be attached to a layer of dielectric material such as KAPTON film. The dielectric layer is indicated in FIG. 9C by the reference numeral 74. Similarly, the member 20 can be manufactured in an etching process and removed from its backing sheet 70 by means of a second layer of double-sided tape 72. Upon attaching the exposed surface of the second double-sided tape 72 to the exposed surface of the dielectric layer 74, the sandwiched coil construction 30 shown in FIG. 9C will be obtained. As shown in FIG. 9G, the layer 74 extends laterally beyond the edges of the members 10, 20 and the tape 72 to form a border approximately 0.25 inch wide that prevents arcing between the edges of the members 10, 20.

In order to protect the members 10, 20 and to provide a dielectric effect, it is desired that the members 20 be encapsulated in some manner. Referring to FIG. 9D, the coil assembly 30 of FIG. 9C is illustrated as being sandwiched between layers 76 of a composite material such as fiberglass/epoxy. A suitable fiberglass/epoxy material can be obtained from Fiberite Corporation under the trademark MXB 7669/7781. After the layers 76 are assembled as illustrated in FIG. 9D, the assembled components are placed in a mold where heat and pressure can be applied so as to conform the coil construction 30 to any desired contour. Although the embodiment illustrated in FIG. 9D is flat, a curved contour should be employed if the coil assembly 30 is to be attached to the curved surface of a structural member. During the application of heat and pressure to the layers 76, it is expected that they will flow at least to a small extent so that gaps between adjacent turns 12, 22 will be filled. The initial thickness of each layer 76 is about 0.010 inch, and the final thickness of each layer 76 is about 0.005–0.006 inch. Also, the edges of the layers 76 will be compressed toward each other to form a tapered configuration that assists in matching the contour of the structural member with which the coil assembly 30 is to be used.

Figure 9E:
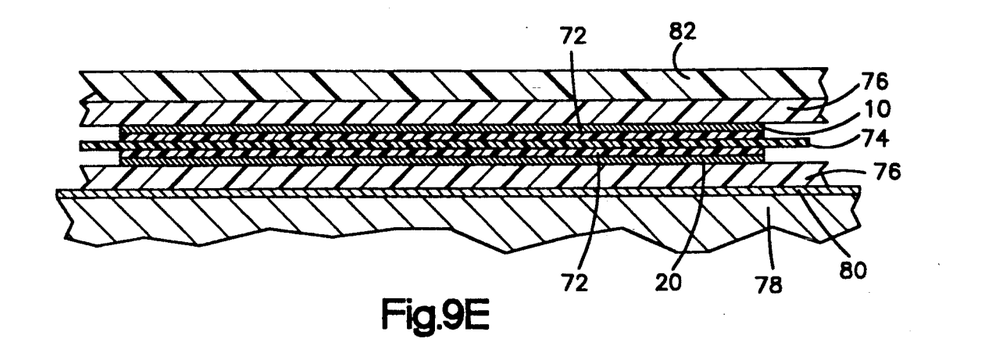

Referring to FIG. 9E, the coil assembly 30 of FIG. 9D is shown as it might be attached to the external surface of a metal structural member 78. The innermost fiberglass/epoxy layer 76 is spaced from the structural member 78 by means of a release layer 80 that permits the coil assembly 30 to move away from and toward the structural member 78. The layer 80 is very thin (about 0.001 inch) and can be obtained from the Richmond Division of Dixico Incorporated under the trademark A5000. A surface ply 82 is positioned over the outermost surface of the exposed layer 76. The ply 82 is secured to the exposed layer 76 by an adhesive such as EA951 commercially available from the Hysol Corporation. If the ply 82 is made of metal such as titanium, aluminum or stainless steel, it should be surface-treated for better adhesion. If the ply 82 is made of a thermoplastic material such as polyetherether ketone (PEEK), surface-treating also is necessary. If the ply 82 is made of another type of thermoplastic material, surface-treating may not be necessary. A metal ply 82 will have a thickness of about 0.005 inch while a non-metal ply 82 will have a thickness of about 0.015 inch. The ends of the layers 80, 82 are attached to the structural member 78 by bonding or any other suitable technique. Typically, an elastomeric support (not shown) would be provided at the ends of the layers 80, 82 in order to provide a smooth transition to the contour of the member 78 and to assist in securing the layers 80, 82 relative to the remainder of the de-icer structure. Regardless of how the layers 80, 82 are connected to the structure 78, it is necessary that at least the layer 82 be able to move away from, and toward, the structural member 78.

In operation, upon supplying a short-duration, shaped, high-current pulse to the coil 30, an electromagnetic field will be generated that will induce eddy currents in the structural member 78 and to a lesser extent in the thin surface ply 82. The eddy currents then will generate electromagnetic fields which will tend to repel the electromagnetic field of the coil 30. In turn, the coil 30, with the surface ply 82 attached, will be forcefully displaced away from the structural member 78. Upon collapse of the magnetic fields, the coil 30 and the surface ply 82 will be forcefully retracted against the structural member 78 to that position shown in FIG. 9E. If the structural member 78 is made of a composite material such as graphite/epoxy instead of metal, a metal target (a so-called "doubler") should be disposed on the outside or inside of the member 78.

Figure 9F:
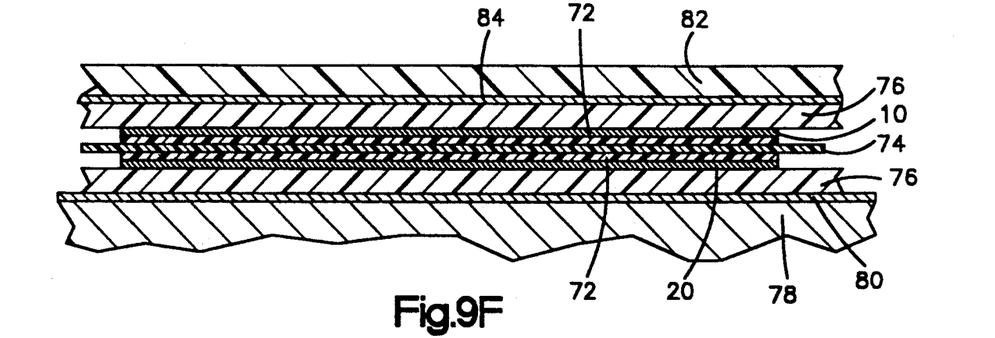
Figure 9G:
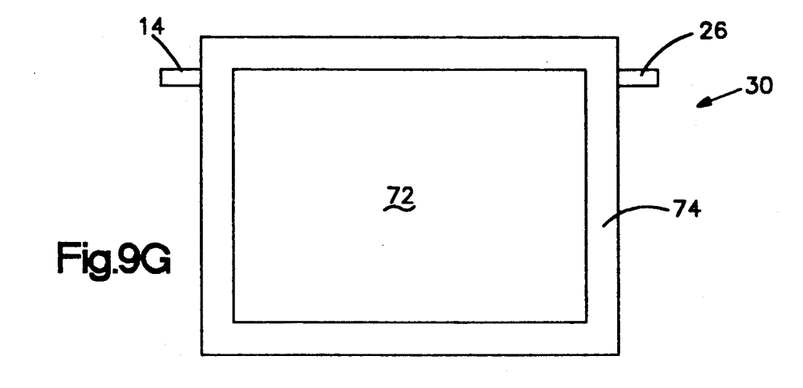
FIG. 9G is a cross-sectional view of the coils of FIG. 9A-9F taken along a plane indicated by line 9G-9G in FIG. 9C.

An additional variation is shown in FIG. 9F. In FIG. 9F, a release layer 84 is disposed intermediate the outermost encapsulating layer 76 and the surface ply 82. Accordingly, the surface ply 82 can move away from, and toward, the coil 30 upon energization thereof. Because the release layer 80 is used in the embodiment shown in FIG. 9F, the coil 30 will move away from, and toward, the structural member 78 if the member 78 is made of metal. If the member 78 is made of a composite material, then the coil 30 will remain in contact with the outer surface of the member 78. In such a circumstance, it may be desirable to eliminate the release layer 80 and bond the innermost encapsulating layer 76 to the member 78 by means of an adhesive such as EA951. Regardless of the material from which the member 78 is made, it will be appreciated that the surface ply 82 always will be forcefully displaced away from, and toward, the member 78 so as to effect a de-icing action.

Figure 10:
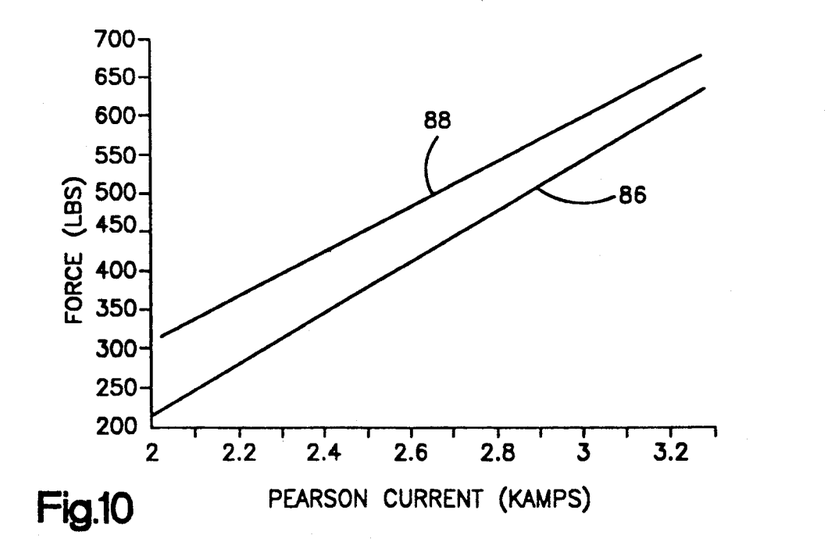
FIG. 10 is a plot of force versus current for coils as illustrated in FIGS. 7 and 8.

Referring to FIG. 10, a plot of force versus current is shown for coils constructed and arranged as shown in FIGS. 7 and 8 as a force element for an electro-repulsive type of de-icer. The tests that were conducted to generate the graph of FIG. 10 were laboratory vice tests in which a transducer was disposed intermediate the adjacent coil pairs 50. The lower plot indicated by the reference numeral 86 shows that the force produced by the coil 60 is a direct function of the current supplied thereto. The uppermost curve indicated by the reference numeral 88 shows that disposing a paramagnetic target material (in this case 6061 aluminum, having a thickness of 0.060 inch) adjacent the outer surface of one of the members 50 produced an enhanced separation force. The difference ranges from approximately 19% at lower current levels to 9% at higher current levels. FIG. 10 confirms that coil pairs operating on the so-called "electro-expulsion" principle such as that disclosed in the Electro-Repulsive Separation System Patent have excellent force-generating capabilities, but that such capabilities can be enhanced by the use of a metal target disposed in proximity with the coils. It is believed that this result is brought about by eddy currents that are induced in the target that create an electromagnetic field that interacts with the electromagnetic field generated by the coil 60. In effect, the magnetic target improves or shapes the magnetic field generated by the coil 60. It is believed that the plot 86 would be representative of the force produced by attaching the coil 60 to a composite structural member 78, while the plot 88 would be representative of the results produced by attaching the coil 60 to a metal structural member 78 or by using a metal surface ply 82 in conjunction with 0.060 inch thick metal targets adjacent the coils.

Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed:

1. A planar coil construction, comprising:
   a first, sheet-like member defined by a first, continuous, electrical conductor having a plurality of turns and first and second ends, the first end of the first conductor defining an electrical input and the second end of the first conductor defining an electrical output;
   a second, sheet-like member defined by a second, continuous, electrical conductor having a plurality of turns and first and second ends, the first end of the second conductor defining an electrical input, and the second end of the second conductor defining an electrical output;
   an electrical connection between the second end of the first conductor and the first end of the second conductor; and
   the first and second sheet-like members being disposed parallel to each other with selected turns of the first electrical conductor being positioned adjacent to selected turns of the second electrical conductor such that the direction of current flow through the turns of the first conductor is in the same direction as the current flow through the turns of the second conductor.

2. The planar coil construction of claim 1, wherein the turns of the first and second conductors are rectangular, with the first end of the first conductor being disposed at the outside of the rectangle and the second end of the first conductor being disposed at the inside of the rectangle, and the first end of the second conductor being disposed at the inside of the rectangle and the second end of the second conductor being disposed at the outside of the rectangle.

3. The planar coil construction of claim 1, wherein the turns of the first and second conductors are spiral-shaped with the first end of the first conductor being disposed at the outside of the spiral and the second end of the first conductor being disposed at the inside of the spiral, and the first end of the second conductor being disposed at the inside of the spiral and the second end of the second conductor being disposed at the outside of the spiral.

4. The planar coil construction of claim 1, further comprising a layer of dielectric material disposed between the first and second sheet-like members.

5. The planar coil construction of claim 4, wherein the dielectric material is a polyamide film.

6. The planar coil construction of claim 4, further comprising means for encapsulating the first and second sheet-like members, the means for encapsulating serving as a dielectric and protecting the sheet-like members.

7. The planar coil construction of claim 5, wherein the means for encapsulating is fiberglass/epoxy.

8. The planar coil construction of claim 1, further comprising a layer of two-sided tape attached to one side of the first sheet-like member and a layer of two-sided tape attached to one side of the second sheet-like member;
   a sheet-like layer of dielectric material disposed between the opposing layers of two-sided tape; and
   encapsulation means for encapsulating the assembled sheet-like members, the means for encapsulating serving as a dielectric and protecting the sheet-like members.

9. The planar coil construction of claim 1, further comprising a layer of paramagnetic material disposed adjacent to, but insulated and separated from, a selected one of the first or second sheet-like members.

10. The planar coil construction of claim 1, further comprising third and fourth sheet-like members substantially identical to the first and second sheet-like members and connected to each other and positioned relative to each other in the same manner as the first and second sheet-like members, the second sheet-like member being connected electrically to the third sheet-like member such that the direction of current flow through the first and second sheet-like members is opposite to that through the third and fourth sheet-like members.

11. The planar coil construction of claim 10, wherein the first, second, third and fourth sheet-like members are of the same size and shape and are completely superimposed.

12. The planar coil construction of claim 10, wherein the first, second, third and fourth sheet-like members are of the same size and shape and the first and second sheet-like members are partially superimposed with respect to the third and fourth sheet-like members.

13. The planar coil construction of claim 1, further comprising third and fourth sheet-like members substantially identical to the first and second sheet-like members and connected to each other and positioned relative to each other in the same manner in the first and second sheet-like members, the second sheet-like member being connected electrically to the third sheet-like member such that the direction of current flow through the first and second sheet-like members is the same as that through the third and fourth sheet-like members.

14. The planar coil construction of claim 13, wherein the first, second, third and fourth sheet-like members are of the same size and shape and are completely superimposed.

15. The planar coil construction of claim 1, further comprising a third sheet-like member substantially identical to the first and second sheet-like members, the third sheet-like member being connected electrically to the second sheet-like member such that the direction of current flow through the first and second sheet-like members is the same as that through the third sheet-like member.

16. The planar coil construction of claim 1, further comprising a third sheet-like member substantially identical to the first and second sheet-like members, the third sheet-like member being connected electrically to the second sheet-like member such that the direction of current flow through the first and second sheet-like members is opposite to that through the third sheet-like member.

17. A planar coil construction, comprising:
    a first, sheet-like member defined by a first, continuous, electrical conductor having a plurality of turns and first and second ends, the first end of the first conductor defining an electrical input and the second end of the first conductor defining an electrical output;
    a second, sheet-like member defined by a second, continuous, electrical conductor having a plurality of turns and first and second ends, the first end of the second conductor defining an electrical input, and the second end of the second conductor defining an electrical output;

an electrical connection between the second end of the first conductor and the first end of the second conductor; and the first and second sheet-like members being disposed parallel to each other with selected turns of the first electrical conductor being positioned adjacent to selected turns of the second electrical conductor such that the direction of current flow through the turns of the first conductor is in the opposite direction as the current flow through the turns of the second conductor.

18. The planar coil construction of claim 17, wherein the turns of the first and second conductors are rectangular.

19. The planar coil construction of claim 1, wherein the turns of the first and second conductors are spiral-shaped.

20. The planar coil construction of claim 1, further comprising a layer of dielectric material disposed between the first and second sheet-like members.

21. The planar coil construction of claim 4, wherein the dielectric material is a polyamide film.

22. The planar coil construction of claim 4, further comprising means for encapsulating the first and second sheet-like members, the means for encapsulating serving as a dielectric and protecting the sheet-like members.

23. The planar coil construction of claim 5, wherein the means for encapsulating is fiberglass/epoxy.

24. The planar coil construction of claim 1, further comprising a layer of two-sided tape attached to one side of the first sheet-like member and a layer of two-sided tape attached to one side of the second sheet-like member;

separable sheet-like layers of dielectric material disposed between the opposing layers of two-sided tape; and encapsulation means for encapsulating the assembled sheet-like members, the means for encapsulating serving as a dielectric and protecting the sheet-like members.

25. The planar coil construction of claim 1, further comprising a layer of paramagnetic material disposed adjacent to, but insulated and separated from, a selected one of the first or second sheet-like members.

26. The planar coil construction of claim 17, further comprising a third sheet-like member substantially identical to the first and second sheet-like members, the second sheet-like member being connected electrically to the third sheet-like member such that the direction of current flow through the third sheet-like member is the same as that through the second sheet-like member.

27. The planar coil construction of claim 26, wherein the first, second and third sheet-like members are of the same size and shape and are completely superimposed.

28. The planar coil construction of claim 17, further comprising a third sheet-like member substantially identical to the first and second sheet-like members, the second sheet-like member being connected electrically to the third sheet-like member such that the direction of current flow through the third sheet-like member is opposite to that through the second sheet-like member.

29. The planar coil construction of claim 28, wherein the first, second and third sheet-like members are of the same size and shape and the second and third sheet-like members are partially superimposed with respect to the each other.

* * * * *